(12) United States Patent
Lei et al.

(10) Patent No.: US 9,984,030 B2
(45) Date of Patent: May 29, 2018

(54) ELECTRONIC DEVICE AND DATA TRANSMISSION SYSTEM

(71) Applicant: Xiaomi Inc., Beijing (CN)

(72) Inventors: Zhenfei Lei, Beijing (CN); Wei Sun, Beijing (CN); Xiangdong Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 221 days.

(21) Appl. No.: 14/833,143

(22) Filed: Aug. 24, 2015

(65) Prior Publication Data

US 2016/0188520 A1 Jun. 30, 2016

Related U.S. Application Data

(63) Continuation of application No. PCT/CN2015/077960, filed on Apr. 30, 2015.

(30) Foreign Application Priority Data

Dec. 31, 2014 (CN) .......................... 2014 1 0851029

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01)

(58) Field of Classification Search
CPC .......................... G06F 13/4068; G06F 13/4282
See application file for complete search history.

(56) References Cited

U.S. PATENT DOCUMENTS 5,019,810 A * 5/1991 Ito .......................... B60W 30/18
                                                            324/509
2010/0259399 A1* 10/2010 Tanno ................. G06F 13/4081
                                                            340/635

(Continued)

FOREIGN PATENT DOCUMENTS

CN         201638203 U     11/2010
CN         201733438 U      2/2011

(Continued)

OTHER PUBLICATIONS

WIPO Translation of CN102778918A (Original document was submitted with an IDS Nov. 9, 2015).*

(Continued)

*Primary Examiner* — Henry Tsai
*Assistant Examiner* — John Roche
(74) *Attorney, Agent, or Firm* — Jun He Law Offices P.C.; James J. Zhu

(57) ABSTRACT

The present disclosure relates to an electronic device and a data transmission system. A first electronic device includes a micro universal serial bus (USB) interface, a central processing unit (CPU) and a diode, wherein a pull-circuit for an identity (ID) pin of the CPU is coupled to a line between the ID pin of the CPU and an ID pin of the micro USB interface; the diode is coupled between the ID pin of the CPU and the ID pin of the micro USB interface, and is coupled between the pull-up circuit and the ID pin of the micro USB interface; the diode has a conducting direction from the ID pin of the CPU to the ID of the micro USB interface. With the present disclosure, the electronic device may be prevented from being damaged.

9 Claims, 3 Drawing Sheets

(56) References Cited

U.S. PATENT DOCUMENTS

| | | | |
|---|---|---|---|
| 2011/0193424 A1* | 8/2011 | Gilbert | G06F 1/189 |
| | | | 307/326 |
| 2014/0106773 A1 | 4/2014 | Li | |
| 2014/0351458 A1 | 11/2014 | Lee et al. | |
| 2015/0207521 A1* | 7/2015 | Waters | H04L 1/0041 |
| | | | 714/807 |
| 2015/0268688 A1* | 9/2015 | Leinonen | G05F 3/02 |
| | | | 307/147 |

FOREIGN PATENT DOCUMENTS

| | | | | |
|---|---|---|---|---|
| CN | 102065160 A | | 5/2011 | |
| CN | 102778918 A | * | 11/2012 | G06F 1/16 |
| CN | 102778918 A | | 11/2012 | |
| CN | 202798652 U | | 3/2013 | |
| CN | 103138071 A | | 6/2013 | |
| CN | 103237189 A | | 8/2013 | |
| EP | 2509001 B1 | | 5/2014 | |
| JP | 2008140311 A | | 6/2008 | |
| JP | 2008158840 A | | 7/2008 | |
| RU | 2233468 C2 | | 10/2000 | |

OTHER PUBLICATIONS

"International Search Report for PCT/CN2015/077960".
Extended European Search Report of European Application No. 15200802.5 dated Jun. 6, 2016.
International Search Report of PCT Application No. PCT/CN2015/077960.

* cited by examiner

ELECTRONIC DEVICE AND DATA TRANSMISSION SYSTEM

CROSS REFERENCE TO RELATED APPLICATIONS

The present application is a Continuation of International Application No. PCT/CN2015/077960 with an international filing date of Apr. 30, 2015, which is based upon and claims priority to Chinese Patent Application No. 201410851029.0 filed on Dec. 31, 2014, the entire contents of which are incorporated herein by reference.

TECHNICAL FIELD

The present disclosure relates to the field of computer technologies, and more particularly, to an electronic device and a data transmission system.

BACKGROUND

With rapid development of computer technology, a variety of electronic devices have been widely used, and have become important tools in people's daily work and life. In order to facilitate data transmission among the electronic devices, people have designed for the electronic devices various types of data transmission interfaces, among which a USB (Universal Serial Bus) interface is a very common data transmission interface.

As technologies develop, there have been diverse types of USB interfaces, among which a micro USB interface, used in a mobile device such as a cellphone, a tablet PC or the like in particular, is a very common type of USB interface. A Type C USB interface is a most recently-developed USB interface and will replace the micro USB interface in the future. In the coming days, devices with the Type C USB interface and devices with the micro USB interface will exist in the market concurrently. Conversion cables for the Type C USB interface and the micro USB interface may provide data transmission for the devices having the two different interfaces. In such conversion cables, an identity (ID) pin of the micro USB interface is generally connected to a CC1 pin (a pin in the Type C USB interface) or a CC2 pin (a pin in the Type C USB interface) of the Type C USB interface.

In some devices having the Type C USB interface, the CC1 pin and a VBUS (power supply) pin are coupled to each other via a resistor. A voltage of the VBUS is generally 5V, and a normal working voltage of the ID pin of the micro USB interface should be 1.8V. Thus, for the device having the Type C USB interface, when it is connected to a device having the micro USB interface via a conversion cable, the device having the micro USB interface may be damaged.

SUMMARY

Embodiments of the present disclosure provide an electronic device and a data transmission system. Technical solutions are as follows.

According to a first aspect of the embodiments of the present disclosure, there provides a first electronic device. The first electronic device includes a micro universal serial bus (USB) interface, a central processing unit (CPU) and a diode, wherein: a pull-up circuit for an identity (ID) pin of the CPU is coupled to a line between the ID pin of the CPU and an ID pin of the micro USB interface; the diode is coupled between the ID pin of the CPU and the ID pin of the micro USB interface, and is coupled between the pull-up circuit and the ID pin of the micro USB interface; and the diode has a conducting direction from the ID pin of the CPU to the ID pin of the micro USB interface.

According to a second aspect of the embodiments of the present disclosure, there provides a data transmission system. The data transmission system includes a second electronic device and the first electronic device as described above, the second electronic device includes a Type C USB interface, wherein: the Type C USB interface of the second electronic device is coupled to the micro USB interface of the first electronic device via a conversion cable.

The technical solutions provided by the embodiments of the present disclosure may include the following advantages.

In embodiments of the present disclosure, the first electronic device includes the micro USB interface, the CPU and the diode. The pull-up circuit for the ID pin of the CPU is coupled to the line between the ID pin of the CPU and the ID pin of the micro USB interface. The diode is coupled between the ID pin of the CPU and the ID pin of the micro USB interface, and is coupled between the pull-up circuit and the ID pin of the micro USB interface. The diode has a conducting direction from the ID pin of the CPU to the ID pin of the micro USB interface. Thus, if the first electronic device is coupled to a device having a Type C USB interface via a conversion cable, and a CC1 pin and a VBUS pin of the device having the Type C USB interface are connected with each other, then the diode may isolate the VBUS pin from the ID pin of the CPU. Consequently, the electronic device may be prevented from being damaged.

BRIEF DESCRIPTION OF THE DRAWINGS

In order to more clearly explain the technical solutions in the embodiments of the present disclosure, hereinafter, the brief introduction to the drawings required to be used in the depiction of the embodiments will be given. It is apparent that the following drawings only illustrate some of the embodiments in the present disclosure, and those skilled in the art could obtain other drawings based on these drawings without inventive labor.

Reference numbers herein are listed as follows:

| 100 | First electronic device | 200 | Second electronic device |
|---|---|---|---|
| 1 | Micro USB interface | 2 | CPU |
| 3 | Diode | 4 | Pull-up circuit |
| 5 | First resistor | 6 | Third resistor |
| 7 | Type C USB interface | 8 | Conversion cable |
| 11 | ID pin of the micro USB interface | 12 | VBUS pin of the micro USB interface |

-continued

| | | | |
|---|---|---|---|
| 13 | D− pin of the micro USB interface | 14 | D+ pin of the micro USB interface |
| 15 | GND pin of the micro USB interface | 21 | ID pin of the CPU |
| 41 | Pull-up power supply | 42 | Second resistor |
| 71 | CC1 pin of the Type C USB interface | 72 | CC2 pin of the Type C USB interface |
| 73 | VBUS pin of the Type C USB interface | 74 | D− pin of the Type C USB interface |
| 75 | D+ pin of the Type C USB interface | 76 | GND pin of the Type C USB interface |

DETAILED DESCRIPTION

In order to make objects, the technical solutions and advantages of the present disclosure more clear, hereinafter, the embodiments of the present disclosure will be described in further detail in conjunction with the accompanying drawings.

First Embodiment

Figure 1:
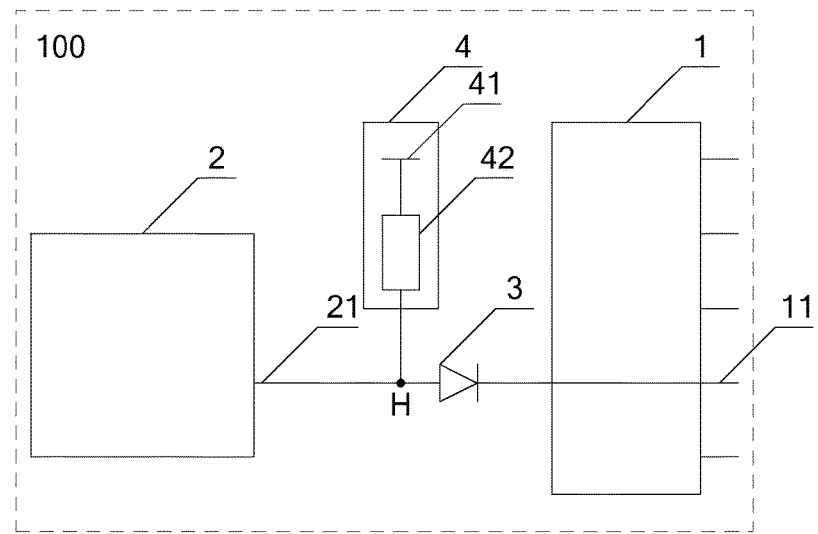
FIG. 1 is a block diagram illustrating an electronic device provided by an embodiment of the present disclosure.

An embodiment of the present disclosure provides an electronic device (hereinafter referred to as a first electronic device 100). As shown in FIG. 1, the first electronic device 100 includes a micro USB interface 1, a central processing unit (CPU) 2 and a diode 3.

A pull-up circuit for an ID pin 21 of the CPU is coupled to a line between the ID pin 21 of the CPU and an ID pin 11 of the micro USB interface. The diode 3 is coupled between the ID pin 21 of the CPU and the ID pin 11 of the micro USB interface, and is coupled between the pull-up circuit and the ID pin 11 of the micro USB interface. A conducting direction of the diode 3 is a direction from the ID pin 21 of the CPU to the ID pin 11 of the micro USB interface.

In an embodiment of the present disclosure, a first electronic device includes a micro USB interface, a CPU and a diode, wherein a pull-up circuit for an ID pin of the CPU is coupled to a line between the ID pin of the CPU and an ID pin of the micro USB interface, the diode is coupled between the ID pin of the CPU and the ID pin of the micro USB interface, and is coupled between the pull-up circuit and the ID pin of the micro USB interface, and the diode has a conducting direction from the ID pin of the CPU to the ID pin of the micro USB interface. Thus, if the first electronic device is connected to a device having a Type C USB interface via a conversion cable, and a CC1 pin and a VBUS pin of the device having the Type C USB interface are connected with each other, then the diode may isolate the VBUS pin from the ID pin of the CPU. Consequently, the electronic device may be prevented from being damaged.

Second Embodiment

An embodiment of the present disclosure provides the first electronic device 100. As shown in FIG. 1, the first electronic device 100 includes the micro USB interface 1, the central processing unit (CPU) 2 and the diode 3. The pull-up circuit 4 for the ID pin 21 of the CPU is coupled to the line between the ID pin 21 of the CPU and an ID pin 11 of the micro USB interface. The diode 3 is coupled between the ID pin 21 of the CPU and the ID pin 11 of the micro USB interface, and is coupled between the pull-up circuit 4 and the ID pin 11 of the micro USB interface. The diode 3 has a conducting direction from the ID pin 21 of the CPU to the ID pin 11 of the micro USB interface.

The diode 3 is an electronic device having characteristics of unidirectional conductance. In the present embodiment, the diode 3 may be a Schottky diode which has strong forward (i.e., a conducting direction) conducting capability and reverse (i.e., a direction opposite to the conducting direction) protective capability.

In an embodiment, the first electronic device 100 may be a device having a micro USB interface, e.g. a cellphone, a Tablet PC or the like. The first electronic device 100 has the micro USB interface 1, and the ID pin 11 of the micro USB interface is coupled to the ID pin 21 of the CPU. The pull-up circuit 4 is used for the ID pin 21 of the CPU in the first electronic device 100, to pull up a voltage at the ID pin 21 of the CPU. The pull-up circuit 4 may be outside or inside the CPU 2. The pull-up circuit 4 may be coupled to the line between the ID pin 11 of the micro USB interface and the ID pin 21 of the CPU at a node H, and the diode 3 may be coupled between the ID pin 11 of the micro USB interface and the node H. Thus, when the first electronic device 100 is connected to a device having a Type C USB interface via a conversion cable 8, and a CC1 pin is connected to a VBUS pin via a resistor in the device having the Type C USB interface, the diode 3 may isolate the VBUS pin from the ID pin 21 of the CPU. The voltage at the ID pin 21 of the CPU may not be influenced by the voltage of the VBUS pin, and may not be elevated to 5V. Thus, the first electronic device 100 will not be damaged.

Optionally, a first resistor 5 may be coupled between the ID pin 11 of the micro USB interface and the ID pin 21 of the CPU.

In an embodiment, the first resistor 5 may be coupled anywhere between the ID pin 11 of the micro USB interface and the ID pin 21 of the CPU, for example, between the diode 3 and the ID pin 21 of the CPU or between the diode 3 and the ID pin 11 of the micro USB interface. With the first resistor 5, the ID pin 21 of the CPU may be protected better, and in case that the voltage at the ID pin 11 of the micro USB interface is relatively large and the diode 3 fails to block a reverse current, the first resistor 5 can further decrease the reverse current to protect the ID pin 21 of the CPU.

Optionally, as shown in FIG. 1, the pull-up circuit 4 includes a pull-up power supply 41 and a second resistor 42. A voltage of the pull-up power supply 41 (referred to as pull-up voltage) may be 1.8V. The second resistor 42 may be coupled between the pull-up power supply 41 and the node H.

Optionally, a resistance of the second resistor 42 may be set to be greater than a lower limit of a preset resistance.

Figure 2:
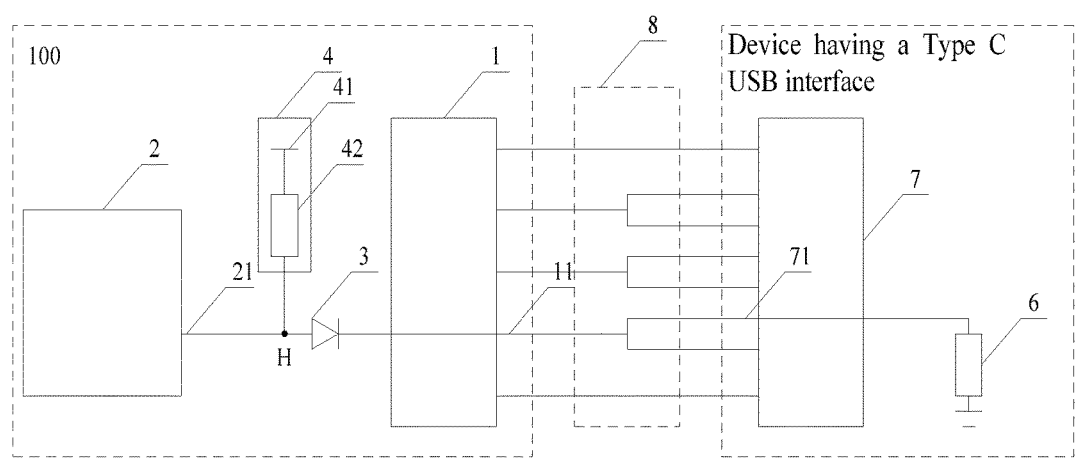
FIG. 2 is a block diagram illustrating a data transmission system provided by an embodiment of the present embodiment.

In an embodiment, the ID pin 21 of the CPU plays an important role in identifying an external electronic device connected through the micro USB interface 1. In other words, when an electronic device is connected to the first electronic device 100, the connection of the electronic device can be determined by change in the voltage at the ID pin 21 of the CPU. For a type of device having a Type C USB interface, a CC1 pin 71 of the device is grounded via a resistor (hereinafter referred to as a third resistor 6). In order to increase the recognition rate when this type of device having the Type C USB interface is connected to the micro USB interface 1 of the first electronic device 100 via the conversion cable 8, the resistance of the second resistor 42 may be set greater than a predefined lower limit of resistance to assure the change in the voltage at the ID pin 21 of the CPU when this type of device having the Type C USB interface is connected to the first electronic device 100, and thereby the recognition rate can be increased. By setting the resistance of the second resistor 42, when the micro USB interface 1 of the first electronic device 100 is not connected to other electronic devices, a voltage detected at the ID pin 21 of the CPU is equal to the voltage of the pull-up power supply 41, for example, equal to 1.8V. When the micro USB interface 1 of the first electronic device 100 is connected to the above type of device having the Type C USB interface via the conversion cable 8, as shown in FIG. 2, the diode 3, the third resistor 6 and the second resistor 42 form a voltage divider with respect to the pull-up voltage, and the voltage at the ID pin 21 of the CPU is equal to a voltage across the diode 3 and the third resistor 6. If the resistance of the second resistor 42 is large enough, the voltage detected by the ID pin 21 of the CPU may be controlled within 30% of the pull-up voltage. Thus, the first electronic device 100 can detect the connection of the device having the Type C USB interface. Then the lower limit of resistance may be set based on the above principle.

Figure 3:
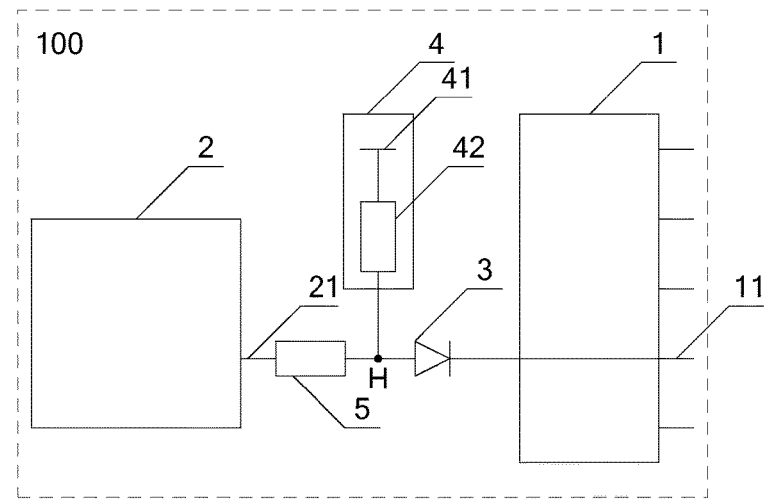
FIG. 3 is a block diagram illustrating an electronic device provided by an embodiment of the present disclosure.

Optionally, as shown in FIG. 3, the first resistor 5 may be coupled between the pull-up circuit 4 and the ID pin 21 of the CPU.

Figure 4:
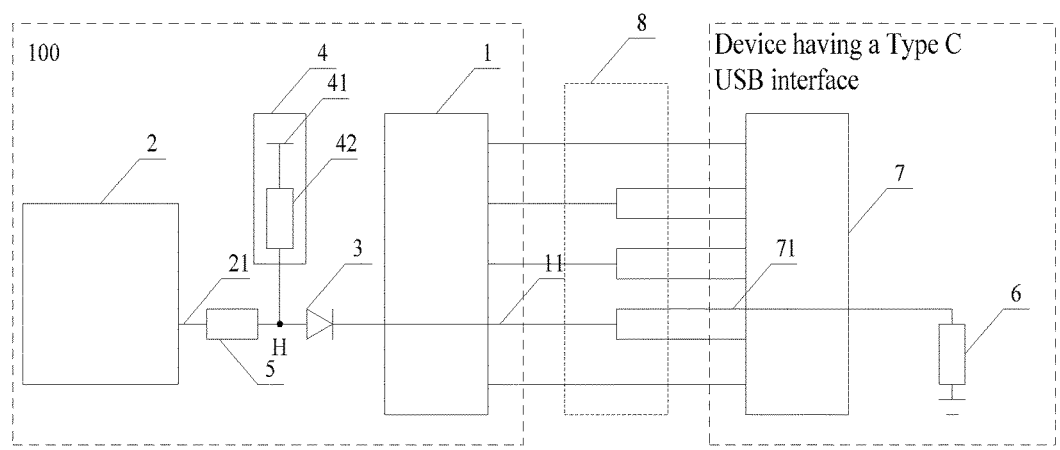
FIG. 4 is a block diagram illustrating a data transmission system provided by an embodiment of the present disclosure.

In an embodiment, for the above type of device having the Type C USB interface whose CC1 pin is grounded via a resistor, in order to increase the recognition rate when this type of device having the Type C USB interface is connected to the micro USB interface 1 of the first electronic device 100 via the conversion cable 8, the first resistor 5 may be coupled between the pull-up circuit 4 and the ID pin of the CPU, i.e. between the node H and the ID pin of the CPU. Thus, when the micro USB interface 1 of the first electronic device 100 is not connected to other electronic devices, a voltage detected by the ID pin 21 of the CPU is equal to the voltage of the pull-up power supply 41 of the pull-up circuit 4, for example, equal to 1.8V. When the micro USB interface 1 of the first electronic device 100 is connected to the above type of device having the Type C USB interface via the conversion cable 8, as shown in FIG. 4, if the first resistor 5 is coupled between the node H and the ID pin 21 of the CPU, the ID pin 21 of the CPU detects a voltage across the diode 3 and the third resistor 6. However, if the first resistor 5 is coupled between the node H and the ID pin 11 of the micro USB interface, the first resistor 5, the diode 3 and the third resistor 6 forms with the second resistor 42 a voltage divider for dividing the pull-up voltage, and the ID pin 21 of the CPU detects a voltage across the diode 3, the first resistor 5 and the third resistor 6 that are coupled in series. Thus, it is more beneficial to couple the first resistor 5 between the node H and the ID pin 21 of the CPU as the voltage detected at the ID pin 21 of the CPU can be further decreased. Thus, it is easier for the first electronic device 100 to detect the connection of the device having the Type C USB interface.

In an embodiment of the present disclosure, a first electronic device includes a micro USB interface, a CPU and a diode. A pull-up circuit for an ID pin of the CPU is coupled to a line between the ID pin of the CPU and an ID pin of the micro USB interface. The diode is coupled between the ID pin of the CPU and the ID pin of the micro USB interface, and is coupled between the pull-up circuit and the ID pin of the micro USB interface. The diode has a conducting direction from the ID pin of the CPU to the ID pin of the micro USB interface. Thus, if the first electronic device is connected to a device having a Type C USB interface via a conversion cable, and a CC1 pin and a VBUS pin of the device having the Type C USB interface are connected with each other, then the diode may isolate the VBUS pin from the ID pin of the CPU. Consequently, the electronic device may be prevented from being damaged.

Third Embodiment

An embodiment of the present disclosure further provides a data transmission system. The data transmission system includes a second electronic device 200 and the first electronic device 100 as described in the above embodiments. The second electronic device 200 includes a Type C USB interface 7, and the Type C USB interface 7 of the second electronic device 200 is connected to the micro USB interface 1 of the first electronic device 100 via a conversion cable 8.

The conversion cable 8 may be a conversion cable with conversion functionality between the Type C USB interface and the micro USB interface.

In an embodiment, the second electronic device 200 may be a device having a Type C USB interface, e.g. a U-disk, a USB speaker or the like. The second electronic device 200 may be any type of device having a Type C USB interface. For example, it may be the above-described type of device having the Type C USB interface whose CC1 pin 71 is connected to the VBUS via a resistor, as shown in FIG. 5; alternatively, it may be the above-described type of device having the Type C USB interface whose CC1 pin 71 is grounded via a resistor, as shown in FIG. 6.

Figure 5:
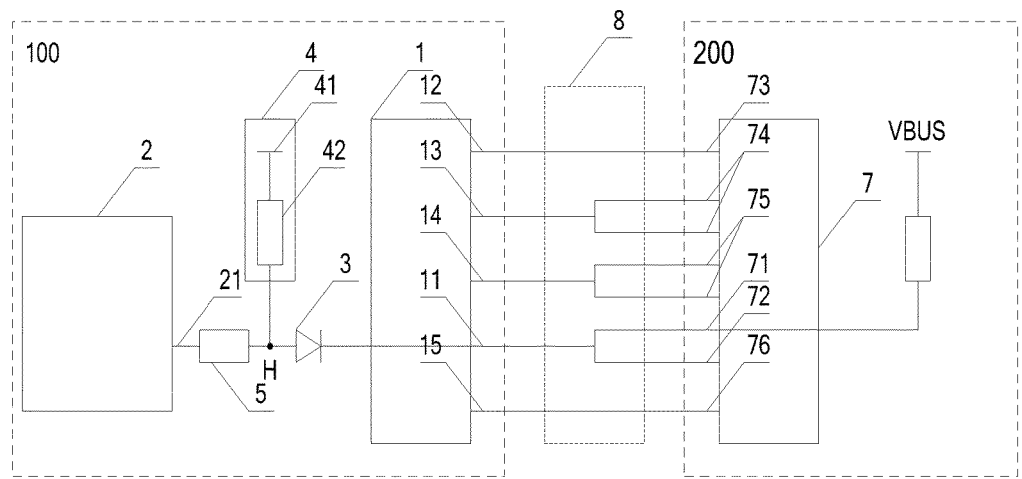
FIG. 5 is a block diagram illustrating a data transmission system provided by an embodiment of the present disclosure.
Figure 6:
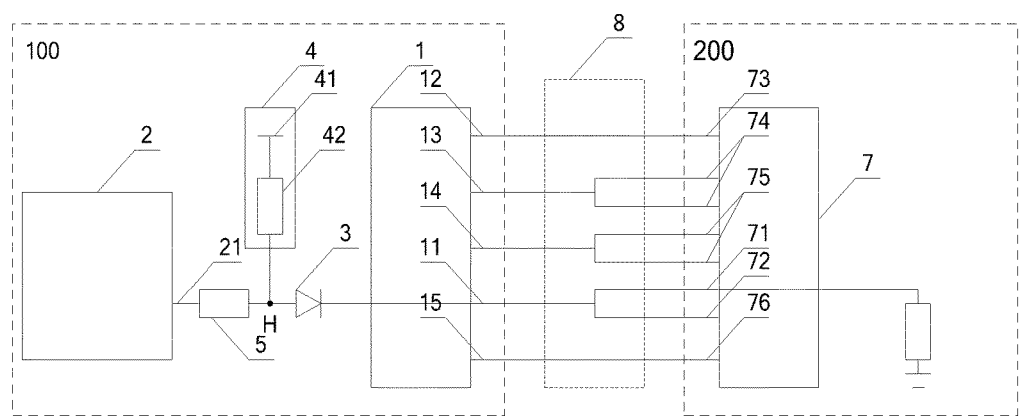
FIG. 6 is a block diagram illustrating a data transmission system provided by an embodiment of the present disclosure.

Alternatively, as shown in FIGS. 5 and 6, the CC1 pin 71 and a CC2 pin 72 of the Type C USB interface are connected to the ID pin 11 of the micro USB interface via the conversion cable 8; a VBUS pin 73 of the Type C USB interface is connected to a VBUS pin 12 of the micro USB interface via the conversion cable 8; a D− pin 74 of the Type C USB interface is connected to a D− pin 13 of the micro USB interface via the conversion cable 8; a D+ pin 75 of the Type C USB interface is connected to a D+ pin 14 of the micro USB interface via the conversion cable 8; and a GND pin 76 of the Type C USB interface is connected to a GND pin 15 of the micro USB interface via the conversion cable 8.

In an embodiment of the present disclosure, the first electronic device includes a micro USB interface, a CPU and a diode, wherein a pull-up circuit for an ID pin of the CPU is connected to a line between the ID pin of the CPU and an ID pin of the micro USB interface, the diode is coupled between the ID pin of the CPU and the ID pin of the micro USB interface, and is coupled between the pull-up circuit and the ID pin of the micro USB interface, and the diode has a conducting direction from the ID pin of the CPU to the ID pin of the micro USB interface. Thus, if the first electronic device is connected to a device having a Type C USB interface via a conversion cable 8 and a CC1 pin and a VBUS pin of the device having the Type C USB interface are connected with each other, then the diode may isolate the VBUS pin from the ID pin of the CPU. Consequently, the electronic device may be prevented from being damaged.

Those skilled in the art may understand that the whole or a part of the steps in the above embodiments may be implemented by hardware, or may be implemented by hardware which is instructed by a program. The program may be stored in a computer readable storage medium, and the storage medium may be an ROM, a magnetic disk or an optical disk, etc.

The above contents are only preferred embodiments of the present disclosure, which are not intended to limit the scope of the present disclosure. Any changes, equivalent substitution and modifications, etc. within the spirit and principle of the present disclosure should fall within the scope of the present disclosure.

What is claimed is:

1. A first electronic device, comprising a micro universal serial bus (USB) interface, a central processing unit (CPU) and a diode, wherein:
   a pull-up circuit for an identity (ID) pin of the CPU is coupled to a line between the ID pin of the CPU and an ID pin of the micro USB interface, wherein the pull-up circuit comprises a pull-up power supply and a pull-up resistor, and wherein a resistance of the pull-up resistor is greater than a lower limit of a preset resistance to assure a change in the voltage at the ID pin of the CPU when the micro USB interface is connected to another electronic device;
   the diode is coupled between the ID pin of the CPU and the ID pin of the micro USB interface, and is coupled between the pull-up circuit and the ID pin of the micro USB interface; and
   the diode has a conducting direction from the ID pin of the CPU to the ID pin of the micro USB interface;
   wherein a resistor is coupled between the ID pin of the micro USB interface and the ID pin of the CPU.

2. The first electronic device according to claim 1, wherein the resistor is coupled between the pull-up circuit and the ID pin of the CPU.

3. The first electronic device according to claim 1, wherein a voltage of the pull-up power supply is 1.8V.

4. The first electronic device according to claim 1, wherein the diode comprises a Schottky diode.

5. A data transmission system, comprising a first electronic device and a second electronic device,
   wherein the first electronic device comprises a micro universal serial bus (USB) interface, a central processing unit (CPU) and a diode, wherein:
   a pull-up circuit for an identity (ID) pin of the CPU is coupled to a line between the ID pin of the CPU and an ID pin of the micro USB interface, wherein the pull-up circuit comprises a pull-up power supply and a pull-up resistor, and wherein a resistance of the pull-up resistor is greater than a lower limit of a preset resistance to assure a change in the voltage at the ID pin of the CPU when the micro USB interface is connected to the second electronic device;
   the diode is coupled between the ID pin of the CPU and the ID pin of the micro USB interface, and is coupled between the pull-up circuit and the ID pin of the micro USB interface; and
   the diode has a conducting direction from the ID pin of the CPU to the ID pin of the micro USB interface;
   and the second electronic device comprises a Type C USB interface, wherein:
   the Type C USB interface of the second electronic device is coupled to the micro USB interface of the first electronic device via a conversion cable;
   wherein a resistor is coupled between the ID pin of the micro USB interface and the ID pin of the CPU.

6. The data transmission system according to claim 5, wherein a CC1 pin and a CC2 pin of the type C USB interface are coupled to the ID pin of the micro USB interface via the conversion cable;
   a power supply VBUS pin of the Type C USB interface is coupled to a VBUS pin of the micro USB interface via the conversion cable;
   a D− pin of the Type C USB interface is coupled to a D− pin of the micro USB interface via the conversion cable;
   a D+ pin of the Type C USB interface is coupled to a D+ pin of the micro USB interface via the conversion cable; and
   a ground GND pin of the Type C USB interface is coupled to a GND pin of the micro USB interface via the conversion cable.

7. The data transmission system according to claim 5, wherein the resistor is coupled between the pull-up circuit and the ID pin of the CPU.

8. The data transmission system according to claim 5, wherein a voltage of the pull-up power supply is 1.8V.

9. The data transmission system according to claim 5, wherein the diode comprises a Schottky diode.

* * * * *